United States Patent [19]
Galdun et al.

[11] Patent Number: 5,933,654
[45] Date of Patent: Aug. 3, 1999

[54] DYNAMIC BUFFER FRACTURING BY A DMA CONTROLLER

[75] Inventors: Daniel J. Galdun, Huntsburg; Peter J. Boldt, W. Farmington, both of Ohio

[73] Assignee: Allen-Bradley Company, LLC, Milwaukee, Wis.

[21] Appl. No.: 08/710,897

[22] Filed: Sep. 24, 1996

[51] Int. Cl.⁶ .................................................. G06F 12/00
[52] U.S. Cl. ........................................ 395/843; 395/842
[58] Field of Search ........................... 395/846, 200.42, 395/200.64, 842–43, 898

[56] References Cited

U.S. PATENT DOCUMENTS

| | | | |
|---|---|---|---|
| 5,247,626 | 9/1993 | Firoozmand | 395/200.42 |
| 5,339,411 | 8/1994 | Heaton, Jr. | 711/171 |
| 5,434,976 | 7/1995 | Tan et al. | 395/200.64 |
| 5,488,724 | 1/1996 | Firoozmand | 395/200.42 |
| 5,561,816 | 10/1996 | Mitsuhira et al. | 395/842 |
| 5,561,821 | 10/1996 | Gephardt et al. | 395/848 |
| 5,687,392 | 11/1997 | Radko | 395/842 |

OTHER PUBLICATIONS

Koichi Tanaka et al., "VLSI Architecture for IEEE 802.5 Token–Ring LAN Controller," IEEE 1989 Custom Integrated Circuits Conference, pp. 15.2.1–15.2.5, 1989.

*Primary Examiner*—Robert B. Harrell
*Assistant Examiner*—David M. Ovedovitz
*Attorney, Agent, or Firm*—John J. Horn; John M. Miller; William R. Walbrun

[57] ABSTRACT

A data control system having a host microprocessor, a data receiving device and a DMA controller. The DMA controller being used to control the fragmentation and recombination of a buffer memory area. The data being processed in data packets and using DMA buffer chaining.

19 Claims, 7 Drawing Sheets

DYNAMIC BUFFER FRACTURING BY A DMA CONTROLLER

BACKGROUND OF THE INVENTION

The present invention is directed to the sending and receiving of data packets in a control system employing intelligent DMA controllers having the capability of using buffer chains established by a host processor, and more particular to buffer management by DMA controllers to achieve efficient use of a buffer memory area for receiving data packets of an unknown size.

In control systems external data is received by a receiving device such as a media access interface chip, which in the following may be called a System Media Access Controller (SMAC), this data is passed to a DMA controller which, acting in cooperation with a host processor, stores the received data in a system memory thereby providing the host processor with access for processing this data.

Commercially available off-the-shelf intelligent DMA controllers are constructed with a capability which allows use of buffer chains established by the host processor to send or receive data packets. Prior to operation of the control system the host processor configures a portion of the system memory into a plurality of data buffers which are assigned to receive the received data. The data buffers are sized large enough to accommodate the largest packet of received data that is expected. Since the arriving packets are of an unknown size, in order to ensure proper operation of the control system each buffer must be large enough to receive a maximum sized data packet or a system error will occur. It is also known, however, that the maximum sized data packet will be much larger than the average or typical sized data packet. Further, it is common in control systems that bursts of numerous small data packets will frequently occur resulting in a large number of data packets being stored in data buffers capable of holding significantly more data.

In existing control systems a single memory area is divided into the substantially equal sized data buffers, each of which corresponds to one of a number of buffer descriptors. The buffer descriptors are combined by the host processor to form buffer chains whereby irrespective of the amount of data, data packets are sequentially entered in the equally sized data buffers. A configuration of this type results in inefficient use of the single memory area when data packets smaller than a maximum data packet is received. This inefficient fragmentation requires a larger than necessary memory area to be designed for the data buffering in a control system, raising the overall cost of the control system. An alternative to adding additional memory is to limit the number of data buffers available, however, this solution increases the potential of reducing the performance of the control system by forcing system functions to wait for buffer availability.

Therefore, it has been deemed desirable to develop a DMA controller for use in a control system which makes it possible to provide dynamic fracturing or fragmentation of a single memory buffer area into smaller memory fragments, as well as including the capability of recombining the used memory fragments for future use.

SUMMARY OF THE INVENTION

In accordance with the present invention, a control system is provided with a receiving device which receives external data, wherein the external data is passed to a DMA controller working in cooperation with a host processor to store received data in system memory. Buffer management responsibilities are given to the DMA controller which performs dynamic fracturing or fragmentation of a single memory buffer area into smaller memory fragments. The DMA controller is further designed to recombine used memory fragments for reuse. Buffer management by the DMA controller allows data packets of unknown sizes to be efficiently stored in a buffer memory area of system memory.

In accordance with a more limited aspect of the present invention, a control system is provided wherein a DMA controller and host processor communicate the physical details of a single buffer memory area and subsequent smaller buffer fragments required for facets of DMA controller channel operation through the use of blocks of buffer descriptors. A buffer descriptor is a three word identification block composed of a descriptor status and control word, a word containing the actual length of a data buffer, and a pointer which points to the start of a data buffer fragment.

An advantage of the present invention is that a buffer memory area is dynamically fragmented during operation of the control system allowing the amount of memory needed for storage of data packets to be decreased.

Yet another advantage of the present invention is provision of buffer management by the DMA controller thereby relieving the burden of buffer management from the host processor.

Still yet another advantage of the present invention is increasing the number of connections which may be made to the control system, and increasing the data storing capability of the control system without requiring an increase in the buffer memory size.

Further advantages will become apparent to one of ordinary skill in the art upon reading and understanding the subject specification.

BRIEF DESCRIPTION OF THE DRAWINGS

This invention may take physical form in certain parts and arrangements of parts, or the practice of certain steps, a preferred embodiment of which will be described in detail in this specification and illustrated in the accompanying drawings which form a part hereof and wherein.

DETAILED DESCRIPTION OF THE PREFERRED EMBODIMENT

Figure 1A:
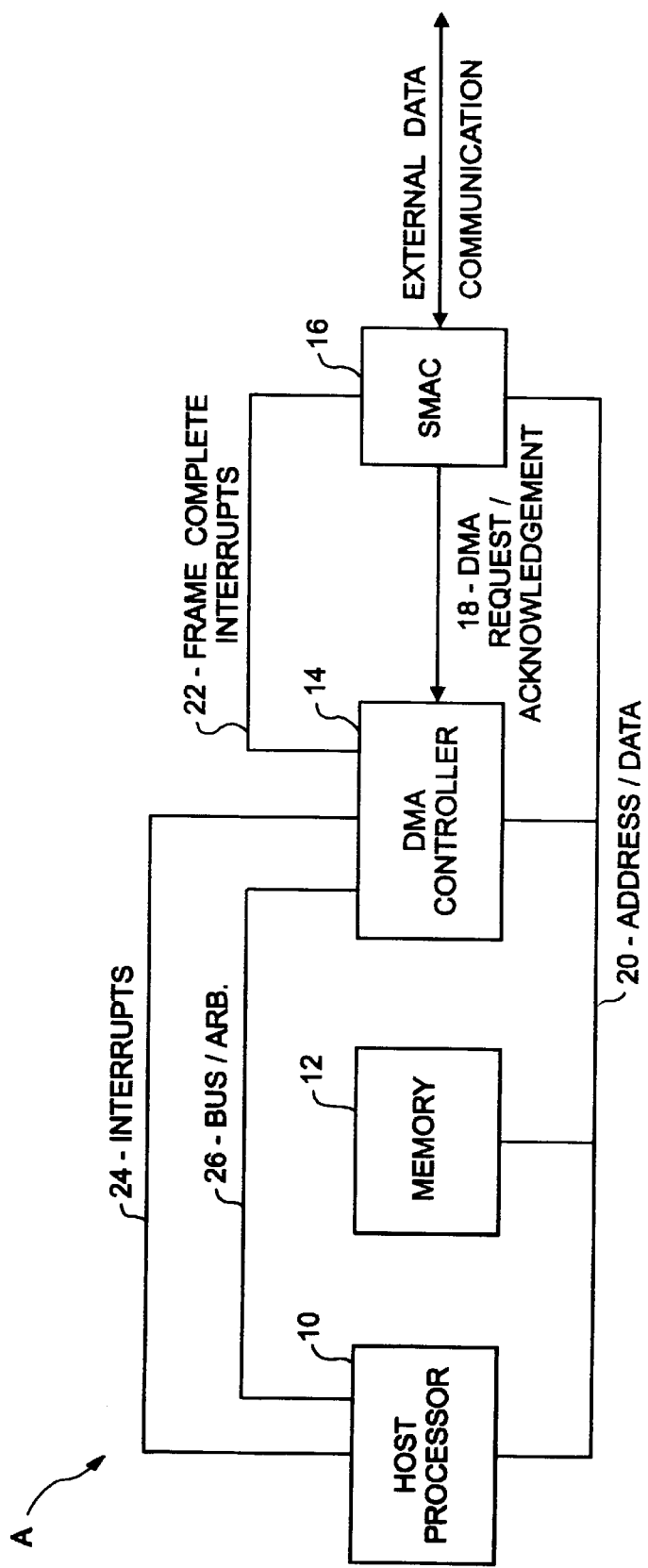
FIG. 1A is a block diagram of a control system according to the subject invention.

Referring now to the drawings which are provided for the purpose of illustrating the preferred embodiment of the invention only, and not for the purpose of limiting the same, FIG. 1A is a block diagram of control system A according to the subject invention. Control system A includes host processor 10, system memory 12, DMA controller 14, and receiver device, such as an ASIC (Applicant Specific Integrated Circuit) SMAC (System Media Access Controller), 16. While not intending to limit the subject invention, in the present embodiment host processor 10 may be one of a variety of microprocessors including a Motorola CPU 32 compatible host, 68340. Further, a PAC1000 programmable peripheral controller manufactured by WaferScale, Inc. of Freemont, Calif., is the platform on which DMA controller 14 is based.

With attention to control system A, externally generated data is received by SMAC 16 from sensors, monitors, other control systems, etc. (not shown). SMAC 16 is provided with a small sized internal buffer for holding a limited amount of the received data. When SMAC 16 receives data in its internal buffers it issues a signal to DMA controller 14, via DMA request/acknowledgement bus 18, to move the data from the SMAC's internal buffers into system memory 12.

Data is moved from SMAC 16 to system memory 12 by DMA controller 14 in a predetermined range of data packet sizes across address/data bus 20. This direct memory access by DMA controller 14 occurs in a maximum of 4-word groups. The basic amount of a data transfer operation from SMAC 16 to DMA controller 14 is a MAC frame, which is configured to contain multiple data packets. The received data is stored in a buffer memory area of system memory 12. When a complete MAC frame has been transferred from SMAC 16 to DMA controller 14 a frame complete interrupt is issued on bus 22 to DMA controller 14.

Following storage of the moved data, interrupts are sent via bus 24 from DMA controller 14 to host processor 10 informing host processor 10 that received data is available for processing in system/memory 12. Bus/arbitration signals are provided on bus 26 between DMA controller 14 and host processor 10 to control various functions of control system A.

DMA controller 14 of the subject invention is configured as a three channel DMA controller to handle, transmit and receive streams of data from and to SMAC 16. DMA controller 14 also requests mastership of host processor bus when one of the DMA channels needs access to system memory 12.

The three DMA channels of DMA controller 14 provide three independent buffer chaining DMA channels to service internal data streams of SMAC 16. Two of the channels are transmit channels and one is a receive channel used to transfer transmit data from system memory 12 to SMAC 16 and transfer received data from SMAC 16 to system memory 12. While the present discussion focuses on a three channel DMA controller, it is to be appreciated the invention can be implemented using DMA controllers with more or less channels.

DMA controller 14 is interruptable by SMAC 16 and is capable of accessing internal registers of SMAC to interrogate and acknowledge interrupts. DMA controller 14 is designed to use SMAC's implicit mode of DMA transfer and its independent DMA channels are configured by a combination of internal registers, set by host processor 10 through FIFO registers of DM controller 14, and buffer chaining configuration information placed in system memory 12 by host processor 10.

DMA controller 14 interfaces with SMAC 16 via the request and acknowledge bus 18 and signals from this bus are used to inform DMA controller 14 that SMAC 16 either has data to transfer to system memory 12, or that SMAC 16 has room in its internal buffers to transmit data. DMA controller 14 interfaces with host processor 10 via host address, data and control bus 26 after obtaining bus mastership. Host processor 10 uses this interface to configure the DMA channels by commands and data written to the registers of DMA controller 14. Host processor 10 also sets up buffer structures in system memory 12 to control the DMAing process. DMA controller 14 uses the interface with host processor 10 to access the data buffers and buffer descriptors. A buffer descriptor being a three word identification block composed of a descriptor status and control word, a word containing the actual length of the data buffer, and a pointer to the start of the data buffer holding information.

Figure 1B:
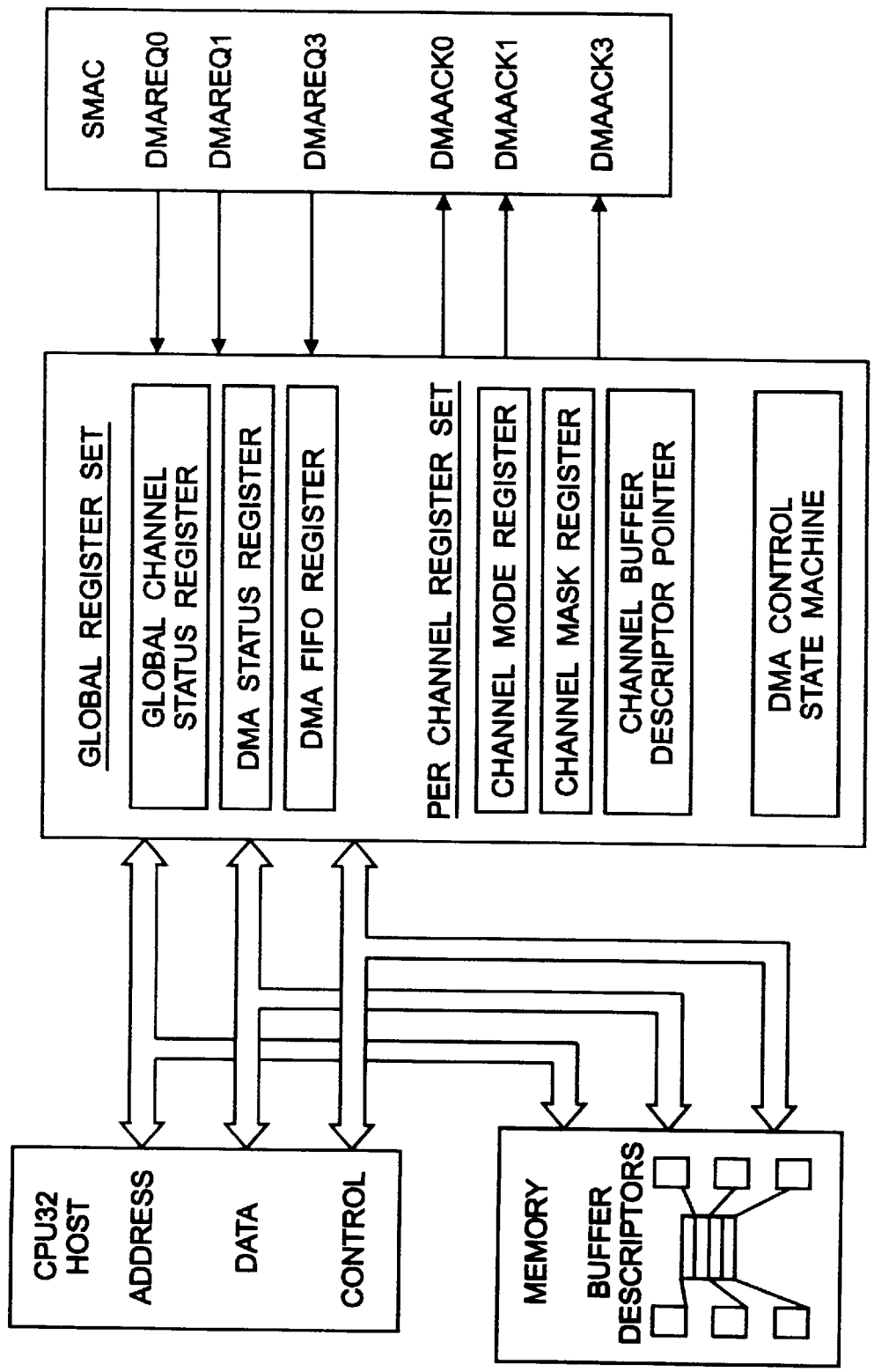
FIG. 1B is a block diagram of a DMA controller used in the control system of the subject invention.

FIG. 1B sets forth a more detailed view of the configuration of a DMA controller 14, illustrating that DMA controller 14 includes a Global Register Set including a Global Channel Status Register, a DMA Status Register, and a DMA FIFO Register. Further, a Channel Register Set is provided for each DMA channel, including a Channel Mode Register, a Channel Mask Register, a Channel Buffer Descriptor Pointer Register, and a DMA Control State Machine Register.

DMA controller 14 supports the implicit mode of transfer of SMAC 16 and manages the DMA process through a buffer chaining mechanism. Host processor 10 configures DMA channels via FIFO commands and data written to DMA controller 14, and by setting up the appropriate buffer descriptors. Host processor 10 then starts DMA controller 14 via Channel Mode Register. Once DMA controller 14 is started by host processor 10, DMA controller 14 automatically services DMA requests from SMAC 16 by sequentially processing a buffer descriptor ring. Under normal operation a user configures buffer descriptors and channel registers for each DMA channel before network start-up.

In such an implementation, the operation of each DMA channel is controlled by its internal configuration registers. The Channel Mode Register is used to configure mode information for DMA operations. The Global Channel Status Register, is used to provide information to host processor 10 regarding all of the DM channels at a single time, where host processor 10 examines individual bits in a received status word to determine a status of each individual channel. The Channel Mask Register, is used to inform DMA controller 14 that host processor 10 needs to be interrupted whenever a corresponding control signal in the Global Channel Status Register, is set.

Each DMA channel retains a Channel Buffer Descriptor Pointer Register which is a 16-bit register holding the address of the start of the buffer descriptor list in memory for a particular channel.

Global Channel Status Register can only be read by host processor 10. In addition, the internal status of DMA controller 14 can be read by host processor 10 from another read only register, wherein the read status word contains DMA controller 14 FIFO information. All other channel register actions are done via a command string written to the FIFO register of DMA controller 14.

Controller Status Register contains the internal status of DMA controller 14, which may only be read. Of particular interest to host processor 10 is the FIFO status register bit, which when set indicates to host processor 10 that there is at least one vacant location in FIFO.

Lastly, DMA Controller Status Machine Register indicates the present status of DMA controller 14.

Data associated with a DMA channel is stored in data buffers configured from system memory 12. Each data buffer is referenced by a buffer descriptor which in one embodiment is 48-bits in length and contains a status and control word, a data buffer word and a pointer to its associated data buffer. The buffer descriptors are formed as a list structure in system memory 12 whereby data buffer chain is formed. Such a chaining is illustrated generally in FIG. 1C. Host 10 sets up a buffer descriptor list for a particular DMA channel before starting that DMA channel. The DMA channel then begins processing buffer descriptors until the DMA process is halted either by host processor 10 setting a stop channel bit in Channel Mask Register, DMA controller 14 encountering a last bit set in a buffer descriptor, or a hardware or software reset.

DMA channel pauses and waits for buffer descriptors to be updated when it encounters a buffer descriptor with a valid bit not set in the status and control word. When host processor 10 is ready for a DMA channel to again start and the current buffer descriptor has been validated, host processor 10 invokes a buffer descriptor update command for the channel to inform DMA controller 14 that the buffer descriptors have been updated and should be re-read.

Figure 1C:
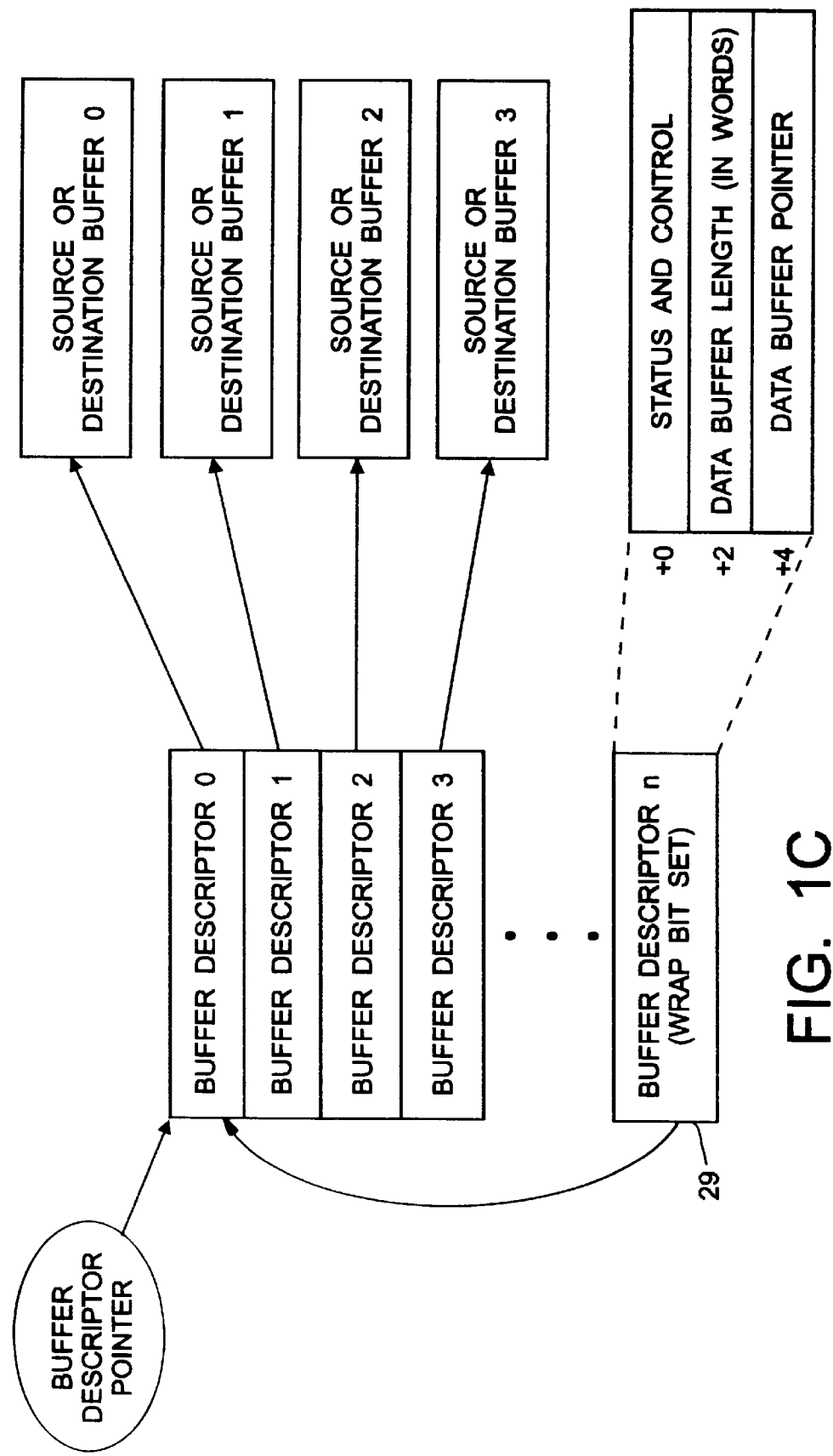
FIG. 1C illustrates the chaining of buffer descriptors.

As previously discussed, the buffer descriptors contain three fields, the status and control word, the data length word and a pointer to the data buffer. As illustrated in FIG. 1C, buffer descriptors 0-n are constructed in a chained type arrangement. A wrap bit 29 indicates to DMA controller 14 whether or not a current buffer descriptor is the final one in the physical list and the process should be wrapped around to the first buffer descriptor in the list. Wrap bit 29 is set by host processor 10 in the final descriptor of buffer descriptor ring 0-n.

Figure 2:
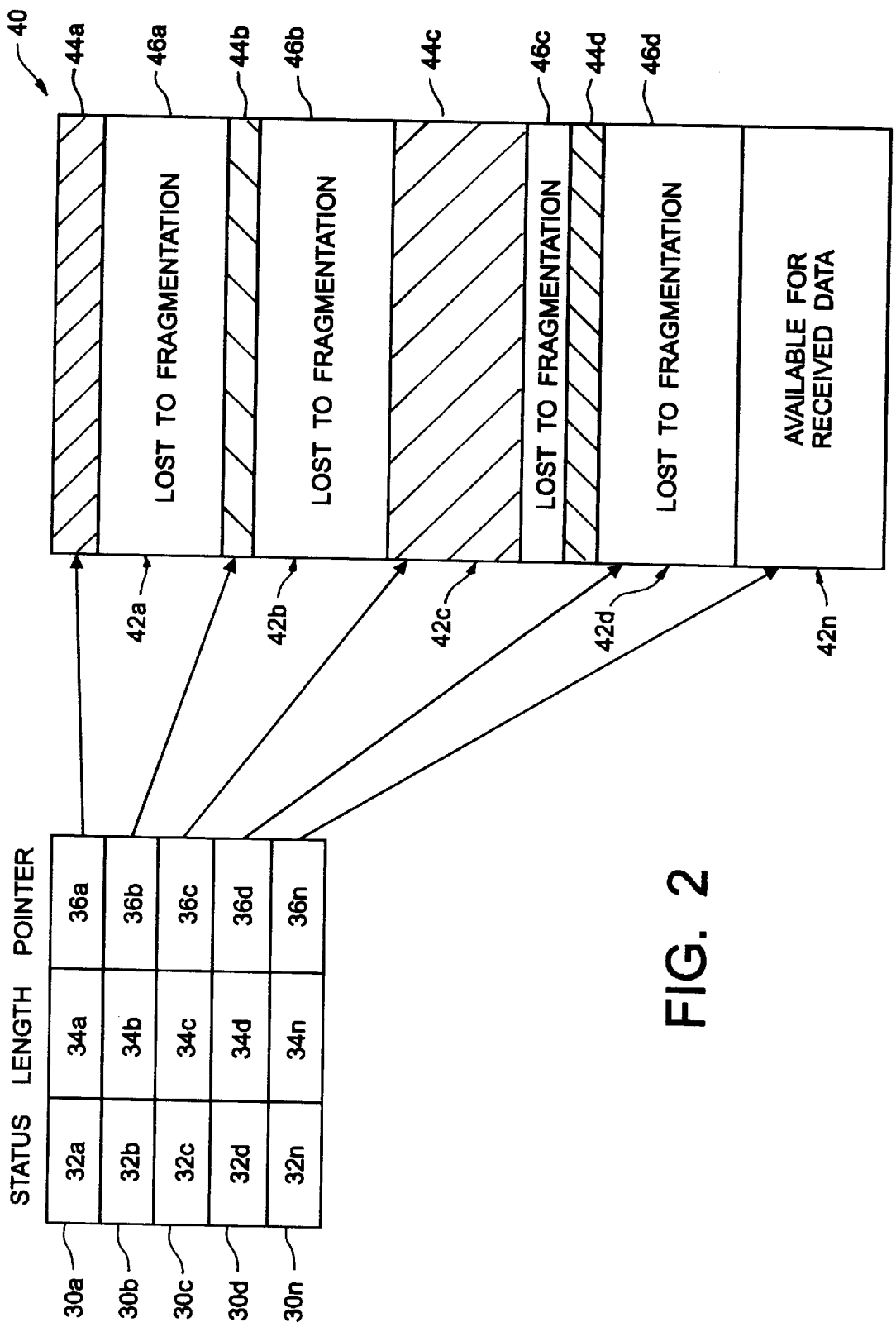
FIG. 2 is a schematic diagram detailing conventional DMA buffer memory utilization.

The data initially received by SMAC 16 is accessed by DMA controller 14 and stored in a buffer area located within system memory 12. In existing control systems of this type, it is known to fragment the buffer area into substantially identically sized memory blocks. These identically sized memory blocks, which are assigned for data reception, need to be large enough to accommodate the largest packet of received data that can be transmitted. An implementation of such a configuration of system memory 12 is illustrated in FIG. 2.

The chained buffer descriptors 30a–30n are each configured to hold a status and control word 32a–32n, a word containing the actual length of the associated data buffer 34a–34n and a pointer 36a–36n to the starting point of a data buffer associated with a buffer descriptor. Buffer memory area 40 is shown fragmented into data buffers 42a–42n. Each of these data buffers having pointers 36a–36n pointing to the beginning of associated data buffer memory locations. The memory locations pointed to by pointers 36a–36n, determined by host processor 10 during system configuration.

With attention to data buffer 42a, it is further illustrated that received data 44a only occupies a portion of the entire data buffer 42a. Therefore, a substantial portion of data buffer 42a is unused memory 46a. This inefficient use of memory exists due to the pre-fragmentation of buffer memory area 40. Similar observations may be made in connection with the remaining data buffers 42b–42n.

Figure 3:
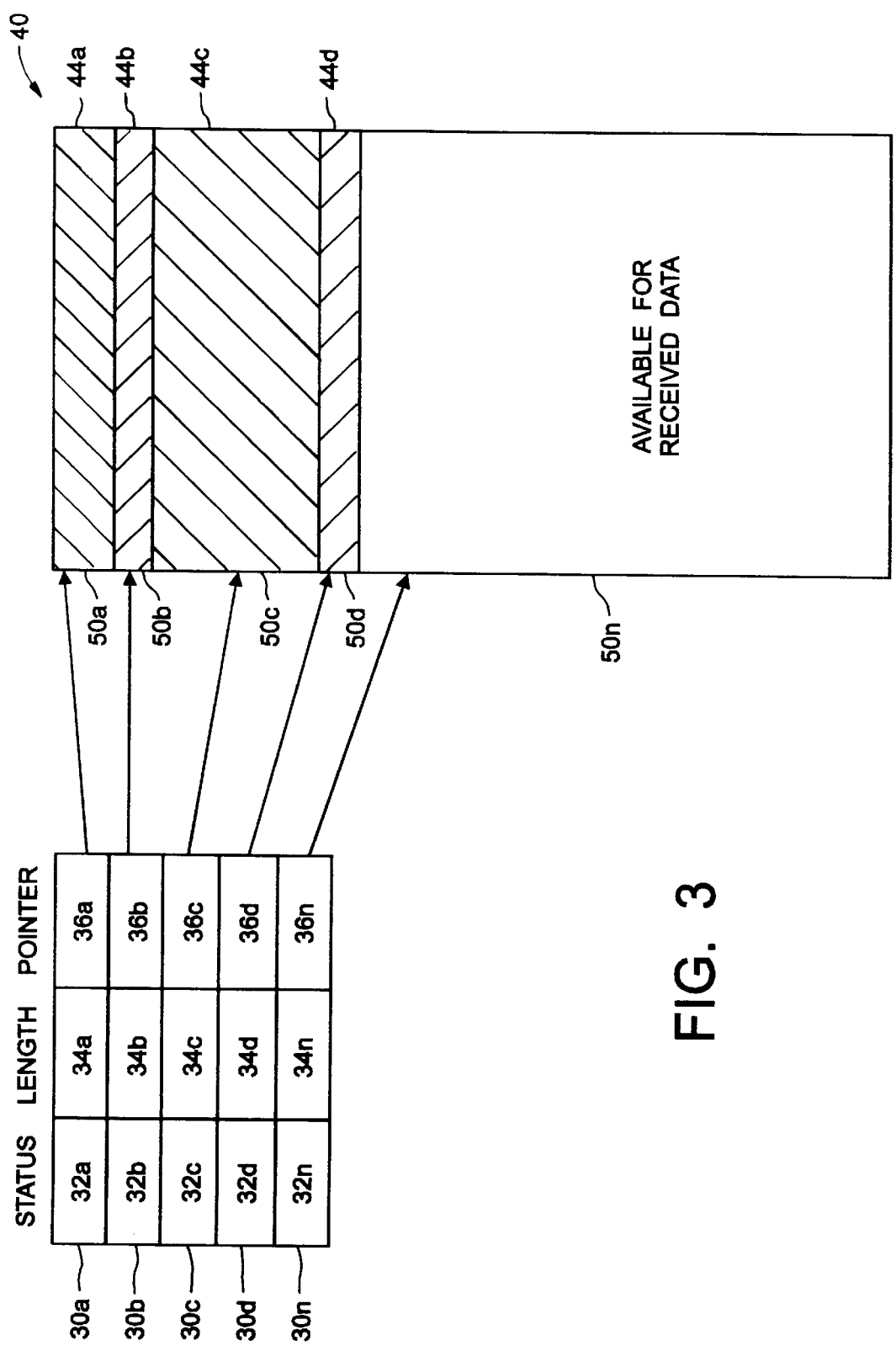
FIG. 3 is a schematic diagram detailing DMA memory utilization according to the subject invention.

Turning attention to FIG. 3, the concepts of the subject invention are more particularly discussed. Specifically, prior to operation of the control system single buffer memory area 40 in the present invention has not been fragmented into substantially equivalently sized blocks of memory, each large enough to the hold the largest possible packet of data to be transmitted. Rather, and as will be described in greater detail below, received data 44a–44n is stored in buffer memory area 40 in a more efficient manner thereby providing additional memory space 48 for data which is still to be received. A difference between the concepts of FIGS. 2 and 3 is that FIG. 2 reflects a control system where host processor 10 is in control of buffer management and fragments buffer memory 40 into substantially equivalently sized blocks of memory during initialization of the control system. On the otherhand, in the subject invention DMA controller 14 is given control of data buffer management and provided with the capacity to dynamically fragment and recombine buffer memory area 40 during control system operation. The DMA controller 14 and host processor 10 communicate physical details of the buffer memory area 40 and subsequent smaller data buffer fragments required for channel operation, through the use of buffer descriptor blocks 30a–30n.

When a DMA channel using buffer fragmentation according to the subject invention is initially configured, host processor 10 provides a pointer to a buffer descriptor block. The initial single buffer memory area 40 is identified by host processor 10. When buffer descriptor pointer 36a is initialized for the first time by host processor 10 it is understood by DMA controller 14 that the buffer size or length and the pointer values in the first descriptor block indicate the size and location of the total single buffer memory area 40. Following this initialization, DMA controller 14 controls the length and pointer values for subsequent DMA transactions as part of a fragmentation process.

A set_cmr0( ) function handles the initialization when the DMA channel is started since buffer information must be available from host processor 10 by the time channel activity is started. Provision of commands which function in a similar manner as the set_cmr 0( ) command are well known in DMA controllers and the manner of providing such a function is well within the understanding of one of ordinary skill in the art and, therefore, further discussion regarding its provision is not believed necessary.

In addition to the previously described registers of DMA controller 14, additional registers are used to control DMA channel activity and dynamic memory fragmentation. Upon completion of initialization, ten of these internal DMA controller registers, which control the DMA channel activity, as well as the fragmentation of the single buffer memory area 40, contain the following information:

DMA CHANNEL CONTROL REGISTERS

| | | |
|---|---|---|
| 1. | BDSTATUS | initial value from host |
| 2. | BDINITPTR | points to the first word of the first buffer descriptor |
| 3. | BDCURRPTR | points to the first word of the first buffer descriptor |
| 4. | BUFFADR_LO | starting location of the single buffer area |
| 5. | COUNT | cleared to 0 |

BUFFER FRAGMENTATION CONTROL REGISTER

| | | |
|---|---|---|
| 6. | UBD | points to the first word of the first buffer descriptor |
| 7. | BUFFSTART | starting location of the single buffer area |
| 8. | BUFFERCURR | starting location of the single buffer area |
| 9. | BUFFUSED | the sum of BUFFSTART and the size of the single buffer area |
| 10. | BUFFEND | the sum of BUFFSTART and the size of the single buffer area |

It is noted that BUFFEND and BUFFUSED both point to the first memory location past the end of the single memory buffer area 40.

Once the above registers are appropriately set, DMA controller 14 is ready to accept information from the receiver device or SMAC 16. Thus, when SMAC 16 obtains data in its internal buffers, a signal is sent to DMA controller 14 to move the data from the internal buffers of SMAC 16 to system memory 12 and particularly into a section of memory corresponding to buffer memory area 40. DMA controller 14 uses the saved buffer descriptor information for the current active buffer descriptor, e.g. 30a, in its internal registers BDSTATUS, BUFFADR_LO, and COUNT. BUFFADR_LO points to the next location in memory to place data from SMAC 16. DMA controller 14 then increments the value in the COUNT register in order to maintain a count of the amount of data moved into buffer memory area 40.

SMAC 16 signals DMA controller 14 when there is no more data to be moved, at which time DMA controller 14 sets the appropriate status bits in the BDSTATUS register and moves that information into the actual buffer descriptor block 30a, in system memory 12. DMA controller 14 then moves the value recorded in the COUNT register out to the buffer descriptor in system memory 12. Following this, DMA controller 14 has completed the current buffer descriptor and must now isolate the area of memory it has written data to from SMAC 16. At this point the data written to memory fragment, e.g. 50a, is controlled by host processor 10 until the data stored therein has been processed.

DMA controller 14 splinters this area of memory 50a, from the single buffer memory area 40 by moving the BUFFCURR internal pointer which currently points at the beginning of the last available memory area in buffer memory area 40. This pointer is changed by adding to it the value of COUNT to essentially skip over the used memory fragment 50a. BUFFCURR always points to the beginning of next free memory area. DMA controller 14 then readies the next buffer descriptor, e.g. 30b in anticipation of receiving more data. Thus, the data buffer memory fragment 50a will be substantially equal in size to the amount of received data 44a stored therein.

The next buffer descriptor 30b, is readied as follows. DMA controller 14 checks to see if the last buffer descriptor was the last in the chain, if it is the last in the chain it will contain wrap around bit 29 of FIG. 1c. When it is determined to be the last in the chain, the BDCURRPTR internal register is re-initialized with the value in BDINITPTR to again point to the top of the descriptor chain 30a. When buffer descriptor 30b is not the last in the chain, DMA controller 14 skips over the just processed buffer descriptor 30a and points to the next buffer descriptor in line 30b, using the adjusted address in the BDCURRPTR internal register. The next buffer descriptor 30b, is checked for availability. If it is not available an error signal is generated. When buffer descriptor 30b is available, the single buffer area 40 is checked to determine if there is at least a minimum amount of memory remaining. This value can be made to vary according to the particular needs of a control system, in the present embodiment it is set at 600 memory locations. If the minimum 600 memory locations is not available an error message is generated and corrective procedures are instituted.

DMA controller 14 senses when the end of single buffer area 40 is approached. In this case, when there is insufficient memory DMA controller 14 shifts back to the top of single buffer memory area 40 and checks for available memory at that point. A continuous block of memory must be available for the next buffer descriptor or the error signal is generated.

When host processor 10 has finished processing a buffer descriptor block, e.g. 30a, and its associated memory fragment, e.g. 50a, host processor 10 manipulates bits in the status word of that buffer descriptor. Particularly, host processor 10 issues a command to DMA controller 14 when in finishes using the buffer to perform a buffer collection, which is the means by which smaller previously used memory fragments are collected for reuse. Buffer collection is accomplished by DMA controller 14 at a point in time after all other DMA activity is completed. A buffer_collect( ) function is responsible for this task. In the subject embodiment one buffer fragment can be recovered per function call.

In operation, issuance of buffer_collect( ) by host processor 10 first causes a check to determine that the oldest used data buffer fragment pointed to by the used buffer descriptor pointer, UBD, is not equal to the current channel buffer descriptor pointer, BDCURRPTR. If it is, the collection task is exited since all previous used buffer fragments have already been collected. If the UBD and current channel buffer descriptor, BDCURRPTR, are not equal, the buffer descriptor status is evaluated. The UBD points to the status word in the three word buffer descriptor, i.e. one of 30a–30n. If the status word indicates the buffer fragment is still in use and has not been invalidated by host processor 10, the collection function is exited since the buffer fragment is not ready to be collected.

If the buffer fragment has been used by host processor 10 and is ready for reclamation, the length of the data buffer fragment taken from the buffer descriptor is added to the reclaimed data buffer fragment to point to the new last available free memory location, which is one past the end of the just freed buffer fragment. This value is stored in BUFFUSED register. The UBD register is then updated to the next buffer descriptor to be interrogated at the next collection time. If the last buffer descriptor examined was the last in the chain, the UBD register is changed to the top of the buffer descriptor chain value.

Figure 4:
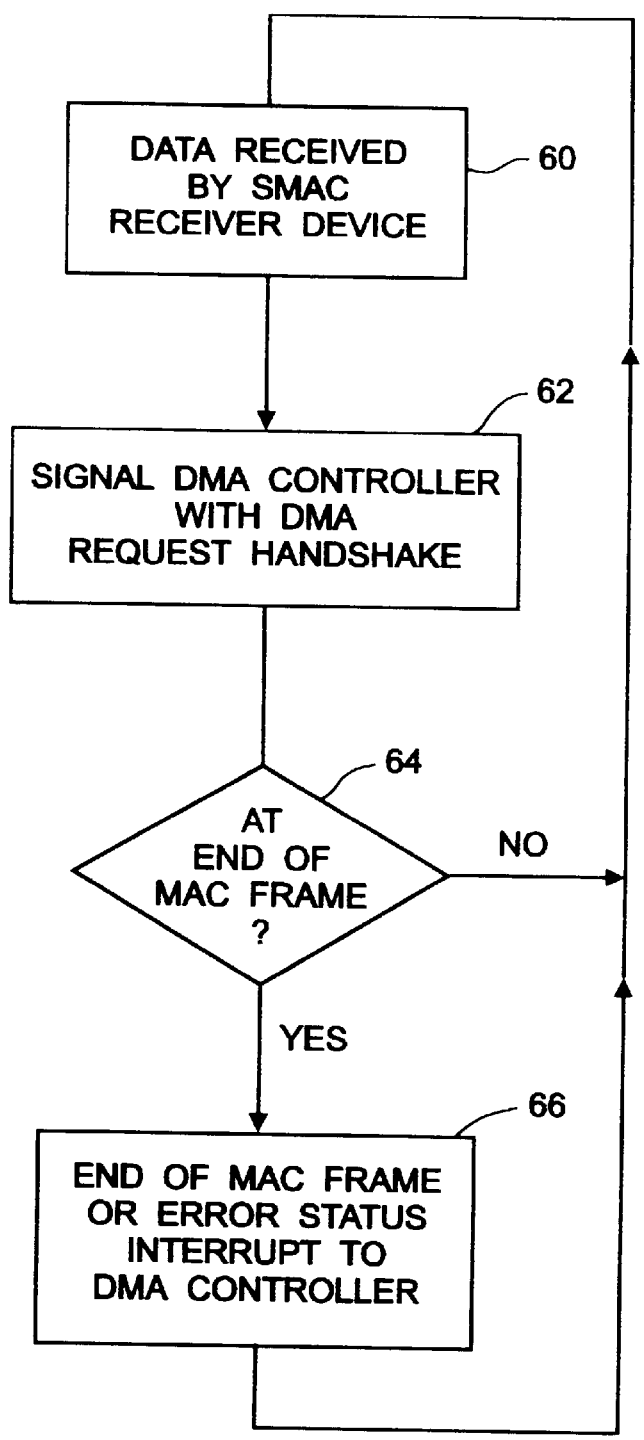
FIG. 4 is a flow chart of data being received by a receiving device of the control system; and, FIG. 5 is a flow chart illustrating the operation of a DMA controller according to the subject invention.

With attention to FIG. 4, the process of receiving data by the receiving device or SMAC is illustrated. Initially, data is received by the SMAC receiving device 60. The SMAC then signals the DMA controller with a DMA request handshake 62. Next, an inquiry is made as to whether a complete MAC frame has been transferred. If it is determined that the processing is not at the end of a MAC frame the process returns to block 60. When it is determined that the process is at the end of a MAC frame, control is moved to block 66 which either acknowledges the end of the MAC frame or sends an error status interrupt to the DMA controller.

Figure 5:
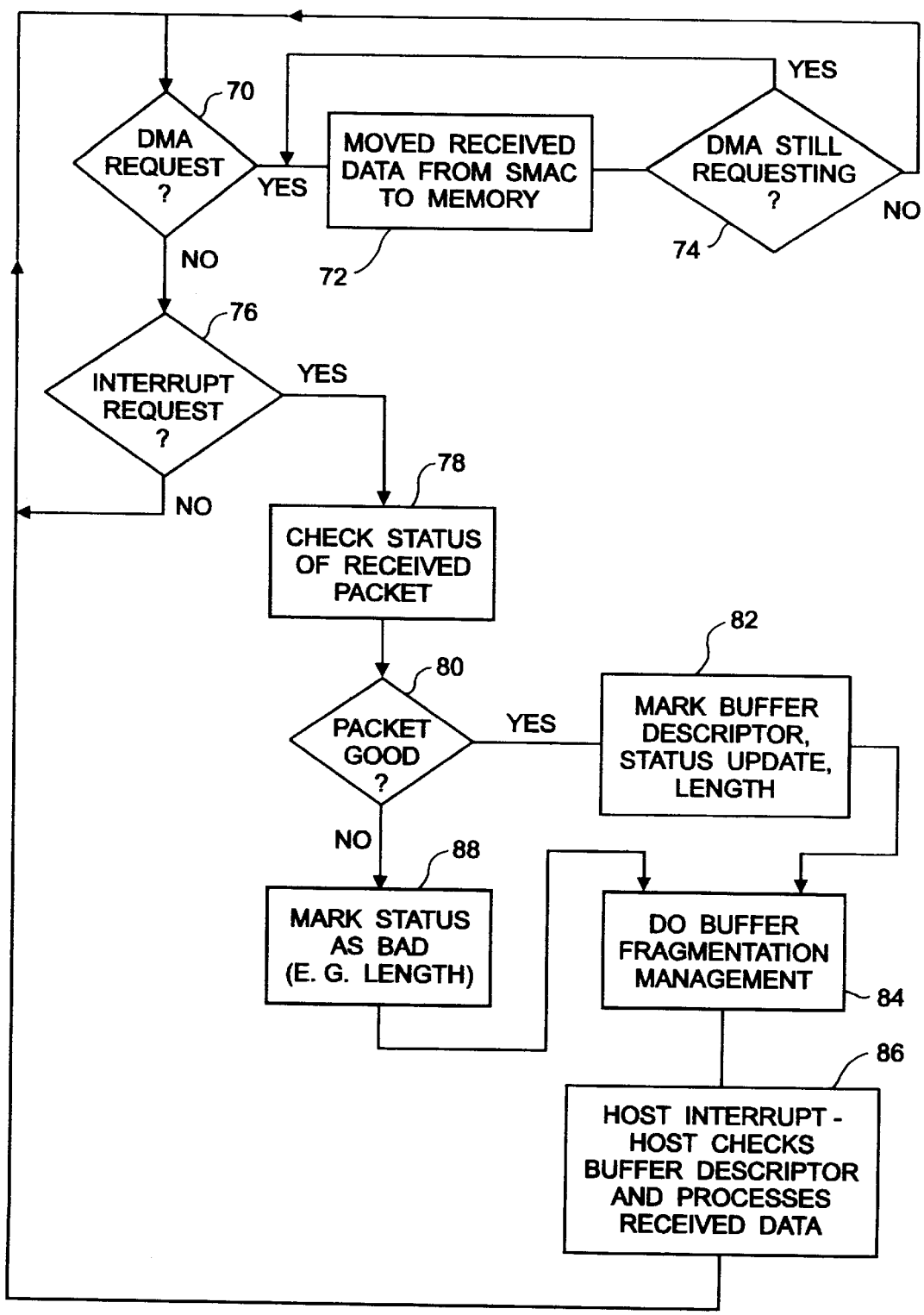

With attention to FIG. 5, a determination is made of whether the DMA controller has received a request 70. If a request has been received from the SMAC, data is moved by the DMA controller from the SMAC to system memory 72. A determination is next made as to whether DMA requests are still being processed 74. When DMA requests are still being processed control is returned to block 72, however, if a DMA request is no longer being made control is transferred to block 70 to investigate whether a new DMA request is issued. When no DMA request is issued, a determination is made whether an interrupt request has been provided 76 to the DMA controller. If no interrupt request is made process control returns to block 70.

Upon issuance of an interrupt request, a check of the status of a received data packet 78 is undertaken to decide if the data packet is acceptable 80. When the data packet is found to be acceptable, control passes to block 82 to mark the buffer descriptor status, and to update the length of the received data. Next, buffer fragmentation management 84 is undertaken by the DMA controller, the steps of this buffer fragmentation have been discussed in detail in the preceding paragraphs.

Following the buffer fragmentation and storage of the data, the host issues an interrupt to check the buffer descriptor information and process any received data 86.

If in step 80 it is determined that there is an error in the data packet, the data packet status is marked as bad in step 88. The buffer fragment management 84 will note the status of the data packet as bad and processing of the data does not occur. Following step 86, the process reverts back to step 70 to continue the processing.

This invention has been described with reference to the preferred embodiment. Obviously, modifications and alterations will occur to others upon a reading and understanding this specification. It is intended that all such modifications and alterations be included insofar as they come within the scope of the appended claims or the equivalents thereof.

Having thus described the invention, it is now claimed:

1. A control system comprising:
    a receiving device configured to receive externally provided data;
    a host processor for processing the data;
    a system memory including a buffer memory area for storing the data wherein the data in said buffer memory area is non-fractured and stored in substantially contiguous memory locations; and
    a DMA controller in operational connection with the receiving device, the host processor, and the system memory, the DMA controller providing buffer management control for controlling the storage of the data in the buffer memory area wherein said buffer management control further comprises dynamically fracturing the buffer memory area, whereby the dynamic fracturing forms substantially contiguous smaller memory fragments from said buffer memory area.

2. The control system according to claim 1 wherein a plurality of buffer descriptors are provided in system memory, each corresponding to data stored in the buffer memory area.

3. The control system according to claim 2 wherein the plurality of buffer descriptors are chained together.

4. The control system according to claim 3 wherein each buffer descriptor includes a status and control word, a word containing a length of a data buffer area and a pointer to the start of a data buffer.

5. The control system according to claim 4 wherein the DMA controller adjusts the information in a plurality of buffer descriptors such that data stored in the data buffer area is stored in said substantially contiguous non-fractured memory locations, irrespective of a size of data being stored, and wherein said dynamic fracturing of the buffer memory area comprises dynamic fracturing or fragmentation of the buffer memory area into said smaller contiguous memory fragments and wherein the DMA controller dynamically recombines said smaller memory fragments during control system operation for reuse.

6. The control system according to claim 1 wherein data is transferred within the control system in data packets of varying sizes.

7. The control system according to claim 1 wherein the receiving device is a media access interface chip.

8. The control system according to claim 7 wherein the DMA controller is interruptible by the media access interface chip, and is further configured with the media access interface chip to access internal registers of the media access interface chip to interrogate and acknowledge interrupts.

9. The control system according to claim 8 wherein the DMA controller is configured to support an implicit mode of transfer of the media access chip.

10. The control system according to claim 1 wherein the DMA, controller, having at least one data channel and internal registers, and host processor are configured together such that the host processor configures the at least one data channel by commands and data written to the internal registers.

11. The control system according to claim 1 wherein movement of the data from the receiving device to the system memory is in a unit of a MAC frame, the MAC frame being comprised of a plurality of data packets.

12. A method of controlling storage of data in a buffer memory area of a control system including a host processor, a system memory, a DMA controller and a receiving device all in operational connection with each other and where the receiving device receives external data which is stored in the buffer memory area located in the system memory, the method comprising the steps of:
    determining, by the DMA controller, a first amount of data which is being stored in a first area of the buffer memory area;
    storing the first amount of data in the first area of the buffer memory area;
    fragmenting the first area of the buffer memory area such that the fragmented first area is substantially equal to the first amount of data stored therein, whereby additional data is prevented from being written to the fragmented area;
    repeating the determining, storing and fragmenting steps for additionally received data; and
    wherein the repeated determining, fragmenting, and storing steps further include determining the size of the data, fragmenting a portion of the buffer memory area to a corresponding size, and storing the data in the fragmented portion such that the fragmented portions of buffer memory area are substantially contiguous to each other.

13. The method according to claim 12 further including a step by the DMA controller of recompiling, including,
    checking fragmented buffer memory areas to determine if the data located therein is required by the host processor; and
    combining fragmented buffer memory areas which are not required by the host processor.

14. The method according to claim 12 wherein the step of fragmenting includes changing information located within a buffer descriptor located in system memory.

15. The method according to claim 12 wherein the repeating step is repeated for all data descriptors located in system memory combined in a data descriptor chain.

16. A control system comprising:
    a receiving device configured to receive externally provided data;
    a host processor for processing the data;
    a system memory including a buffer memory area for storing the data wherein the data in said buffer memory area is non-fractured and stored in substantially contiguous memory locations; and
    a DMA controller in operational connection with the receiving data, the host processor, and the system memory, the DMA controller providing buffer management control for controlling the storage of the data in the buffer memory area, such that data stored in the buffer memory area are stored in contiguous non-fractured memory locations in the buffer memory area, irrespective of a size of data being stored, and wherein said buffer management control further comprises dynamically fracturing the buffer memory area, whereby the dynamic fracturing forms substantially contiguous smaller memory fragments from said buffer memory area.

17. The control system according to claim 16 wherein a plurality of buffer descriptors are provided in system memory, each corresponding to data stored in the buffer memory area.

18. The control system according to claim 17 wherein the plurality of buffer descriptors are chained together.

19. The control system according to claim 18 wherein each buffer descriptor includes a status and control word, a word containing a length of a data buffer area and a pointer to the start of a data buffer, wherein the DMA controller adjusts the information in a plurality of buffer descriptors to ensure that data stored in the data buffer area is stored in the substantially contiguous memory locations, and wherein said dynamic fracturing of the buffer memory area comprises dynamic fracturing or fragmentation of the buffer memory area into said smaller contiguous memory fragments and wherein the DMA controller dynamically recombines said smaller memory fragments during control system operation for reuse.

* * * * *